United States Patent
Brooks et al.

(10) Patent No.: US 9,145,273 B2
(45) Date of Patent: Sep. 29, 2015

(54) VEHICLE RESTRAINTS WITH STOP MECHANISMS

(75) Inventors: Andrew Brooks, Thiensville, WI (US); Ben Wieberdink, Cedar Grove, WI (US); Bradley J. Stone, Port Washington, WI (US); Timothy Cotton, Milwaukee, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 13/233,884

(22) Filed: Sep. 15, 2011

(65) Prior Publication Data
US 2013/0017045 A1   Jan. 17, 2013

Related U.S. Application Data

(63) Continuation of application No. 13/182,049, filed on Jul. 13, 2011.

(51) Int. Cl.
*B65F 9/00* (2006.01)
*B65G 69/00* (2006.01)

(52) U.S. Cl.
CPC ..................... *B65G 69/003* (2013.01)

(58) Field of Classification Search
CPC ........................................ B65G 43/06
See application file for complete search history.

(56) References Cited

U.S. PATENT DOCUMENTS

| | | |
|---|---|---|
| 2,722,449 A | 11/1955 | Harley |
| 4,208,161 A | 6/1980 | Hipp et al. |
| 4,267,748 A | 5/1981 | Grunewald et al. |
| 4,282,621 A | 8/1981 | Anthony et al. |
| 4,373,847 A | 2/1983 | Hipp et al. |
| 4,379,354 A | 4/1983 | Hahn et al. |
| 4,472,099 A | 9/1984 | Hahn et al. |
| 4,560,315 A | 12/1985 | Hahn |
| 4,605,353 A | 8/1986 | Hahn et al. |
| 4,648,781 A | 3/1987 | Sikora |

(Continued)

FOREIGN PATENT DOCUMENTS

| | | |
|---|---|---|
| CA | 2140743 | 6/1999 |
| CN | 1926034 | 3/2007 |

(Continued)

OTHER PUBLICATIONS

United States Patent and Trademark Office, "Non-Final Office Action," issued in connection with U.S. Appl. No. 13/182,049, mailed Apr. 4, 2012, 14 pages.

(Continued)

*Primary Examiner* — Saul Rodriguez
*Assistant Examiner* — Willie Berry, Jr.
(74) *Attorney, Agent, or Firm* — Hanley, Flight & Zimmerman, LLC

(57) ABSTRACT

Some example vehicle restraints that include a movable barrier for selectively blocking a vehicle's RIG (Rear Impact Guard) near the dock face of a loading dock also include a spring loaded brace that helps hold the barrier in its blocking position, even when the RIG separates from the barrier. To hold the brace in its activated position where it supports the barrier, some examples of the brace include a tooth that engages a detent in a catch. The catch, in some examples, includes a tooth-engaging surface that protrudes into a circular path along which the tooth can travel relative to the barrier.

3 Claims, 9 Drawing Sheets

(56) References Cited

U.S. PATENT DOCUMENTS

| | | | |
|---|---|---|---|
| 4,674,941 | A | 6/1987 | Hageman |
| 4,759,678 | A | 7/1988 | Hageman |
| 4,843,373 | A | 6/1989 | Trickle et al. |
| 4,861,217 | A | 8/1989 | Erlandsson |
| RE33,242 | E | 6/1990 | Hipp et al. |
| 4,988,254 | A | 1/1991 | Alexander |
| 5,026,242 | A | 6/1991 | Alexander |
| 5,071,306 | A | 12/1991 | Alexander |
| 5,096,359 | A | 3/1992 | Alexander |
| 5,203,663 | A | 4/1993 | Ruppe |
| 5,297,921 | A | 3/1994 | Springer et al. |
| 5,340,181 | A | 8/1994 | Matsuyama |
| 5,348,437 | A | 9/1994 | Krupke et al. |
| 5,505,575 | A | 4/1996 | Alexander |
| 5,882,167 | A * | 3/1999 | Hahn et al. .................... 414/401 |
| 6,139,242 | A | 10/2000 | Alexander |
| 6,162,005 | A | 12/2000 | Fritz |
| 7,841,823 | B2 | 11/2010 | Sveum et al. |
| 8,616,826 | B2 | 12/2013 | Cotton et al. |
| 2004/0042882 | A1 | 3/2004 | Breen |
| 2005/0169732 | A1 | 8/2005 | Sveum et al. |
| 2006/0045678 | A1 | 3/2006 | Andersen |
| 2008/0095598 | A1 | 4/2008 | Cotton et al. |
| 2010/0266375 | A1 | 10/2010 | Ion |
| 2011/0158778 | A1 | 6/2011 | Harrington |
| 2011/0243694 | A1 | 10/2011 | Andersen et al. |
| 2013/0017044 | A1 | 1/2013 | Brooks et al. |
| 2014/0064891 | A1 | 3/2014 | Brooks |
| 2014/0064892 | A1 | 3/2014 | Proffitt et al. |

FOREIGN PATENT DOCUMENTS

| | | |
|---|---|---|
| WO | 2013009960 | 1/2013 |
| WO | 2014035727 | 3/2014 |

OTHER PUBLICATIONS

International Searching Authority, "International Search Report," issued in connection with application serial No. PCT/US2012/046416, mailed Sep. 28, 2012, 5 pages.

International Searching Authority, "Written Opinion of the International Searching Authority," issued in connection with application serial No. PCT/US2012/046416, mailed Sep. 28, 2012, 7 pages.

United States Patent and Trademark Office, "Final Office Action," issued in connection with U.S. Appl. No. 13/182,049, mailed Oct. 25, 2012, 10 pages.

United States Patent and Trademark Office, "Non-Final Office Action," issued in connection with U.S. Appl. No. 13/182,049, mailed Apr. 11, 2013, 18 pages.

International Searching Authority, "International Search Report," issued in connection with International Application No. PCT/US2013/055808, on Nov. 8, 2013 4 pages.

International Searching Authority, "Written Opinion," Issued in connection with International Application No. PCT/US2013/055808, on Nov. 8, 2013, 7 pages.

Rite-Hite Holding Corporation, "G3 Posi-Lok," 4 Sheets drawings/text, Drawing #1262; Drawing #56158; dated Sep. 26, 1989.

International Bureau, "International Preliminary Report on Patentability," issued in connection with International application No. PCT/US2012/046416, mailed on Jan. 23, 2014, 8 pages.

United States Patent and Trademark Office, "Notice of Allowance," issued in connection with U.S. Appl. No. 13/182,049, on Jun. 23, 2014 (5 pages).

United States Patent and Trademark Office, "Notice of Allowance and Fees Due," issued in connection with U.S. Appl. No. 13/182,049, mailed Oct. 17, 2013, 18 pages.

United States Patent and Trademark Office, "Notice of Allowance," issued in connection with U.S. Appl. No. 13/182,049, mailed Jan. 20, 2015, 28 pages.

United States Patent and Trademark Office, "Non-Final Office Action", issued in connection with U.S. Appl. No. 13/604,315, mailed Feb. 5, 17 pages.

State Intellectual Property Office of the People'S Republic of China, "First Office Action," issued in connection with Chinese application serial No. 201280034260.X, issued Jan. 12, 2015, 18 pages.

International Bureau, "International Preliminary Report on Patentability," issued in connection with International Patent Application No. PCT/US2013/055808, issued on Mar. 3, 2015, 8 pages.

IP Australia, "Patent Examination Report No. 1," issued in connection with Australian Patent Application No. 2012281071, dated Mar. 23, 2015, 3 pages.

Canadian Intellectual Property Office, "Office Action," issued in connection with Canadian Patent Application No. 2,840,237, dated Mar. 12, 2015, 3 pages.

Canadian Intellectual Property Office, "Office Action", issued in connection with Canadian Patent Application No. 2,825,536, dated Mar. 31, 2015 (3 pages).

European Patent Office, "Extended European Search Report," issued in connection with European Patent Application No. 15000161.8, on Jun. 15, 2015, 11 pages.

European Patent Office, "Extended European Search Report," issued in connection with European Patent Application No. 15000162.6, on Jun. 15, 2015, 11 pages.

The United States Patent and Trademark Office, "Non-Final Office Action," issued in connection with U.S. Appl. No. 13/599,770, on Jun. 25, 2015, 48 pages.

The United States Patent and Trademark Office, "Notice of Allowance," issued in connection with U.S. Appl. No. 13/604,315, on Jun. 30, 2015, 33 pages.

* cited by examiner

VEHICLE RESTRAINTS WITH STOP MECHANISMS

CROSS REFERENCE TO RELATED APPLICATION

This patent arises from a continuation of U.S. patent application Ser. No. 13/182,049, filed Jul. 13, 2011, entitled "Vehicle Restraints with Stop Mechanisms," which is incorporated herein by reference in its entirety.

FIELD OF THE DISCLOSURE

This patent generally pertains to vehicle restraints and, more specifically, to stop mechanisms for such restraints.

BACKGROUND

When loading or unloading a truck parked at a loading dock, it is generally a safe practice to help restrain the truck from accidentally moving too far away from the dock. This is often accomplished by a hook-style vehicle restraint that engages what is often referred to in the industry as a truck's ICC bar (Interstate Commerce Commission bar) or RIG (Rear Impact Guard). An ICC bar or RIG is a bar or beam that extends horizontally across the rear of a truck, below the truck bed. Its primary purpose is to help prevent an automobile from under-riding the truck in a rear-end collision. A RIG, however, also provides a convenient structure for a hook-style restraint to reach up in front of the bar to obstruct the bar's movement away from the dock. To release the truck and prepare for the next one to enter, many restraints descend below the bar to a preparatory position.

Although the horizontal bar of a RIG is fairly standardized, the bar's supporting structure can vary significantly. In some cases, the supporting structure can interfere with the operation of the restraint. Some supporting structures can make it difficult for a vehicle restraint to sense the location of the bar and determine whether the bar is properly restrained.

BRIEF DESCRIPTION OF THE DRAWINGS

FIG. 6 is a top view of FIG. 5, wherein line 5-5 generally represents the cross-section line upon which FIGS. 1-5 and 7 are based.

FIG. 7 is a cross-sectional side view similar to FIG. 5 but showing the barrier moving from an example intermediate blocking position to an example stored position.

DETAILED DESCRIPTION

Figure 1:
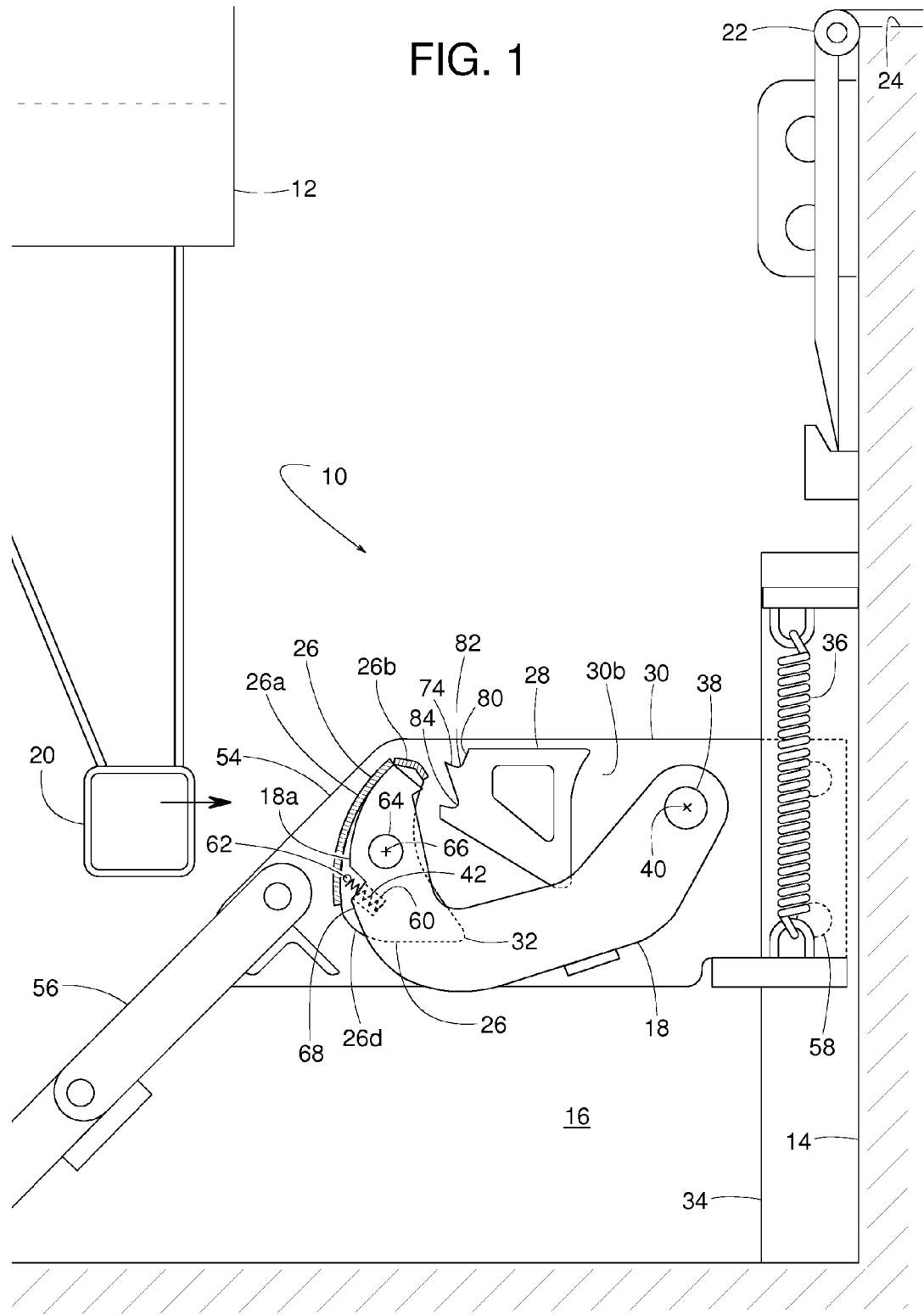
FIG. 1 is a cross-sectional side view of an example vehicle restraint disclosed herein.

FIGS. 1-7 show an example vehicle restraint 10 that helps prevent a vehicle 12 (e.g., truck, trailer, etc.) from accidentally moving too far forward away from a dock face 14 of a loading dock 16 while cargo is being added or removed from the vehicle. To limit such forward movement, restraint 10 includes a barrier 18 for capturing or restraining the vehicle's RIG 20 (Rear Impact Guard), also known as an ICC bar (Interstate Commerce Commission bar). When vehicle 12 is safely restrained, a dock leveler 22 can be deployed to provide a bridge across which forklifts and other material handling equipment can travel to transfer cargo between vehicle 12 and an elevated platform 24 of dock 16. The term, "RIG" encompasses the horizontal impact bar and may include any structure associated therewith including, but not limited to the framework or structure that connects the bar to the rest of the vehicle.

Figure 4:
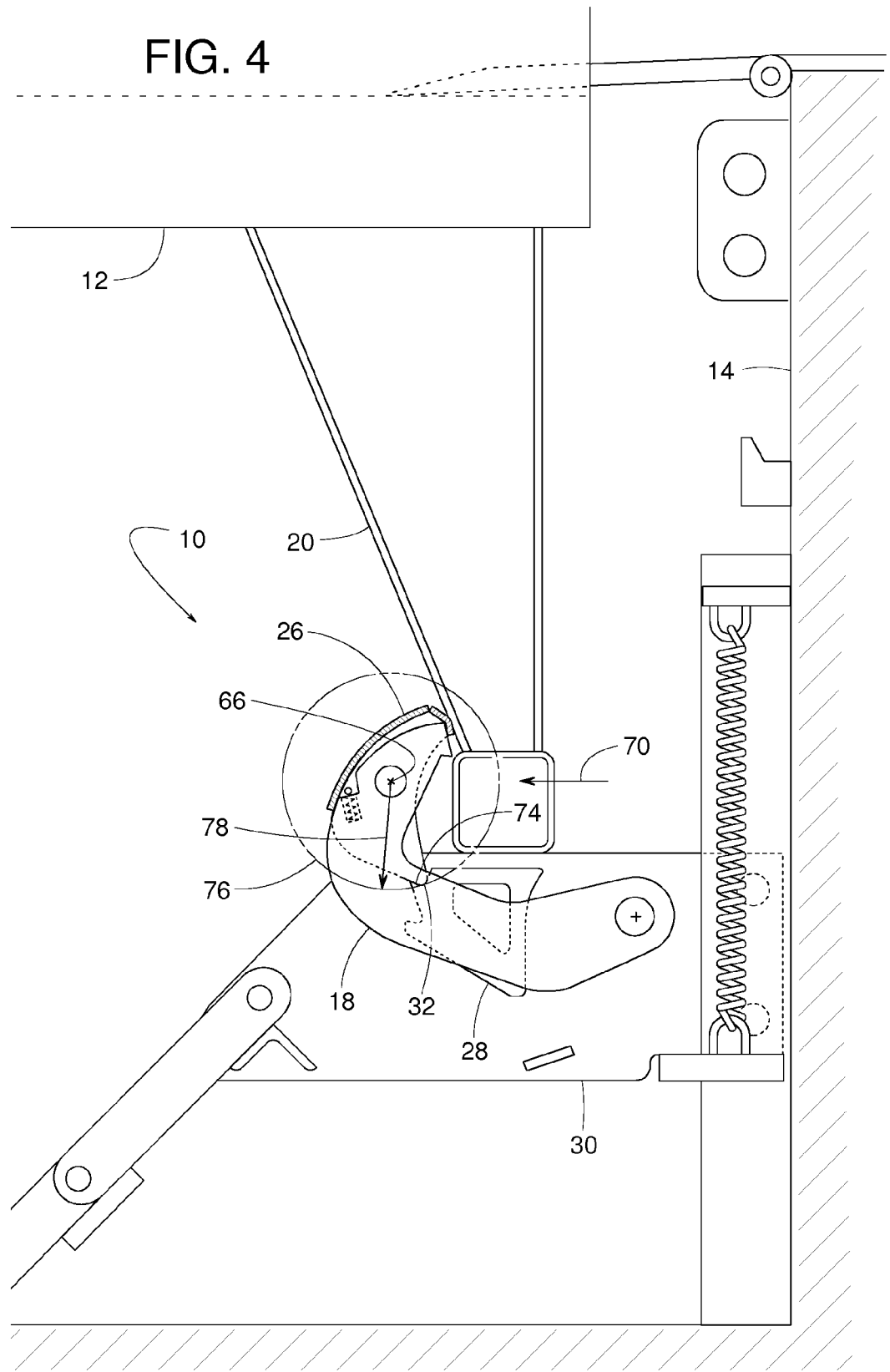
FIG. 4 is a cross-sectional side view similar to FIG. 3 but showing a RIG of the vehicle pushing the barrier to an intermediated blocking position.
Figure 5:
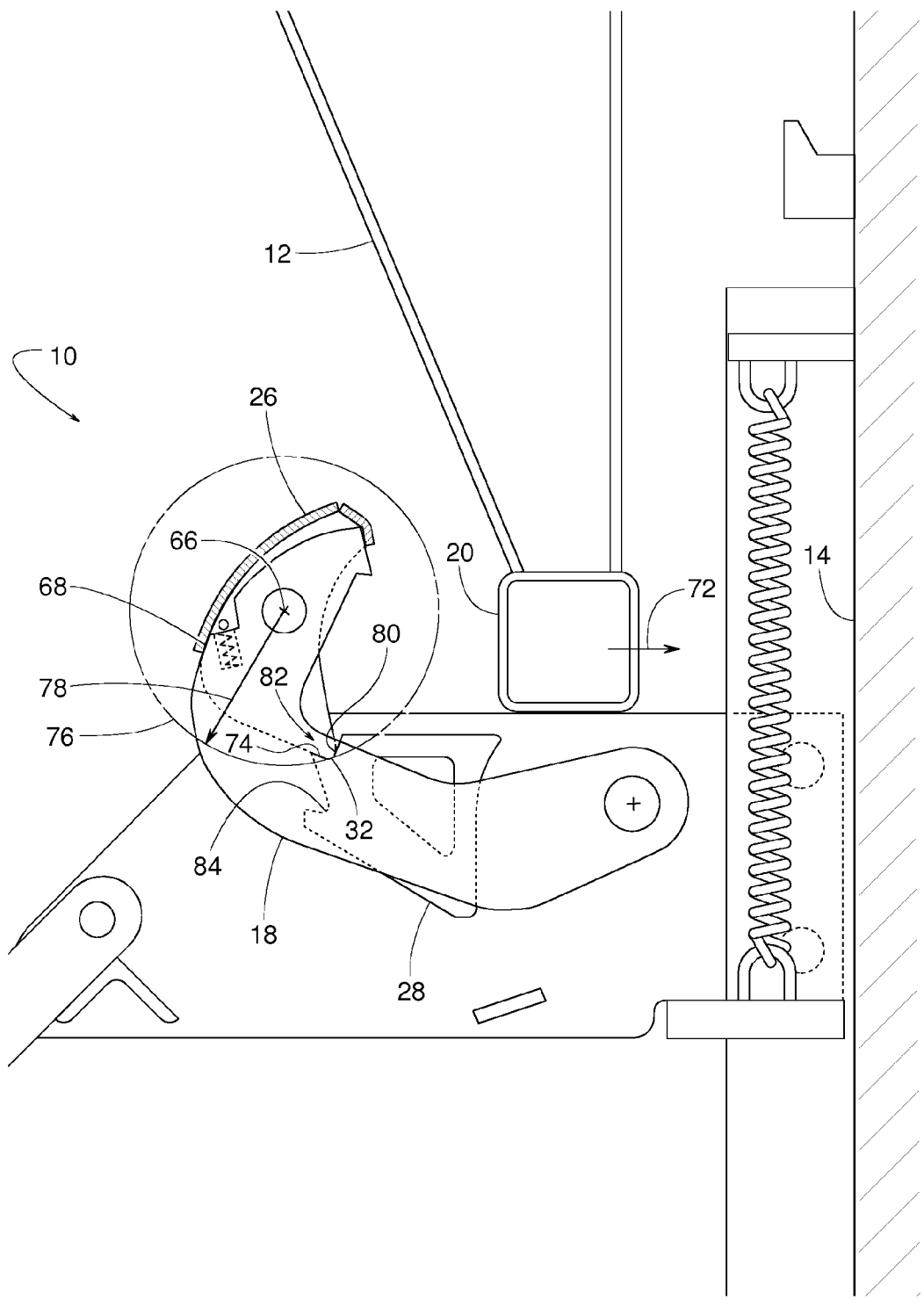
FIG. 5 is a cross-sectional side view taken along line 5-5 of FIG. 6 and shows the RIG having separated away from the barrier.

To ensure that barrier 18 can engage or positively restrain RIG 20, vehicle restraint 10 includes a brace 26 movable relative to barrier 18 between an activated position (FIGS. 3-6) and a release position (FIGS. 1, 2 and 7) for selectively engaging and releasing a catch 28 disposed at a substantially fixed location on a main body 30 of restraint 10. When a tooth 32 of brace 26 engages catch 28, as shown in FIGS. 4 and 5, such engagement limits the movement of barrier 18 so that if vehicle 12 attempts to depart dock 16 prematurely, wherein RIG 20 urges barrier 18 back down toward its stored position, tooth 32 abutting catch 28 holds barrier 18 at a position sufficient to still restrain RIG 20, as shown in FIGS. 4 and 5.

Figure 6:
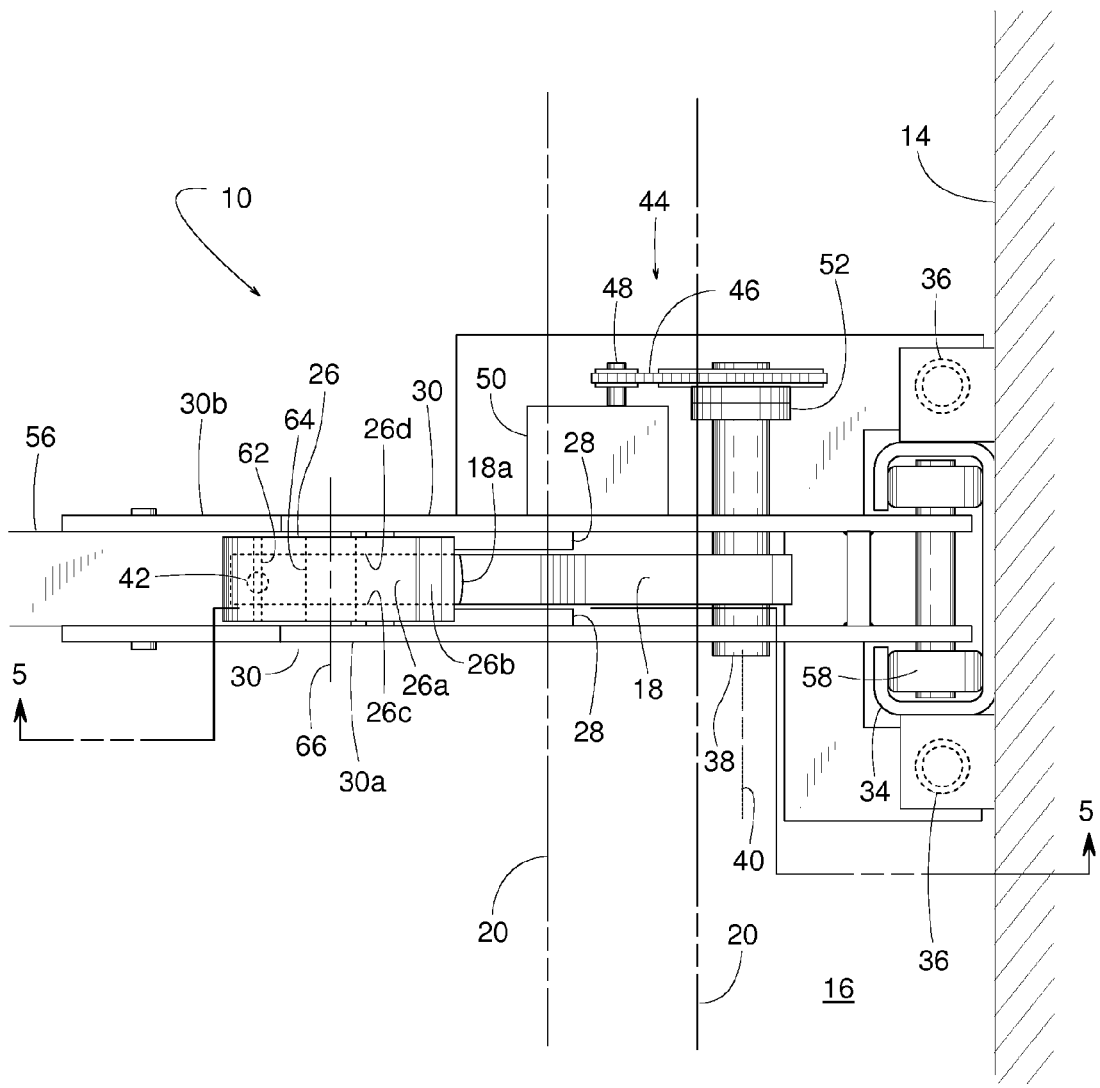
Figure 7:
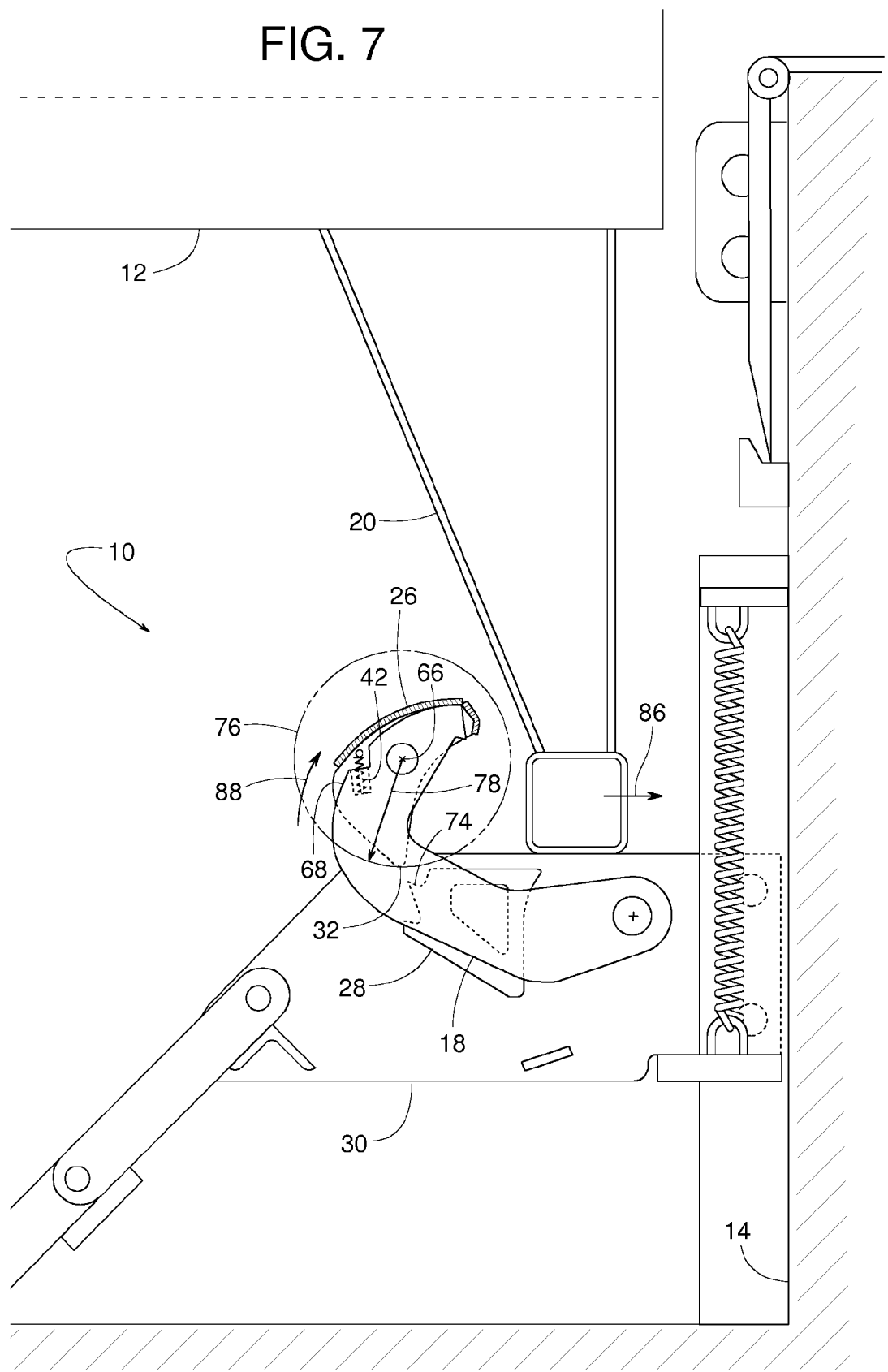

The vehicle restraint 10 of the illustrated example includes vehicle restraint 10 having a track 34 attached to dock face 14, main body 30 comprising plates 30a and 30b (FIG. 6) mounted for vertical travel along track 34, one or more biasing elements or springs 36 that urge main body 30 upward, and a shaft 38 pivotally connecting barrier 18 to main body 30 such that barrier 18 can rotate about an axis 40 relative to main body 30. This example of vehicle restraint 10 also includes catch 28 and a compression spring 42 for urging brace 26 toward its release position (FIGS. 1, 2 and 7).

In operation, the example vehicle restraint 10 may follow the sequence illustrated by FIGS. 1, 2, 3, 4, 5 and 7. For example, FIG. 1 shows vehicle 12 backing into dock 16 and approaching vehicle restraint 10. At this point in the operation, spring 36 holds main body 30 at a raised preparatory position to receive RIG 20. To allow vehicle 12 to move RIG 20 back over the top of barrier 18, a drive unit 44 (e.g., hydraulic motor, electric motor, hydraulic cylinder, etc., as shown in FIG. 6) retracts barrier 18 to the stored position relative to main body 30.

Figure 2:
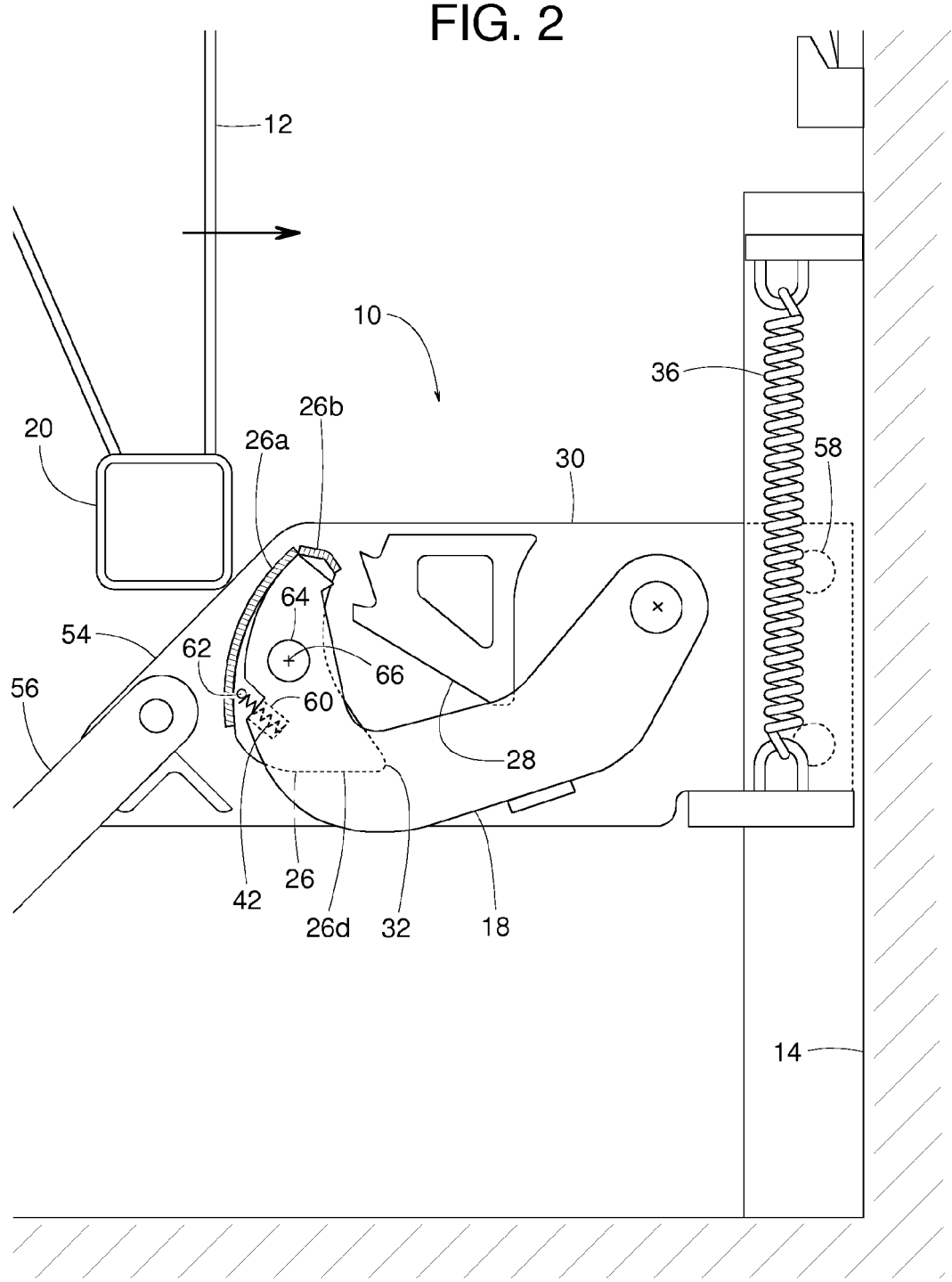
FIG. 2 is a cross-sectional side view similar to FIG. 1 but showing a vehicle pushing a main body of the restraint downward.

FIG. 2 shows vehicle 12 continuing to move back toward dock face 14. Upon doing so, RIG 20 forces the vehicle restraint's main body 30 downward by RIG 20 sliding along a ramp portion 54 of main body 30. In cases where RIG 20 is exceptionally low, an articulated lead-in ramp extension 56 is used in some examples to guide RIG 20 onto ramp 54. In this example, a set of rollers 58 on main body 30 and extending into track 34 minimizes friction as main body 30 travels vertically along track 34. As RIG 20 pushes main body 30 down, as shown in FIG. 2, barrier 18 remains in the stored position, and brace 26 remains in the release position.

While the main body 30 moves from the position of FIG. 1 to that of FIG. 2, brace 26 remains in the release position due to compression spring 42, which is disposed in a cavity 60 in barrier 18. Spring 42 imparts a force or pushes against a rod 62 (or other suitable feature) attached to brace 26. In this example, brace 26 is a boot having a curved front panel 26a and a nose plate or vehicle engaging tip 26*b* (nose plate 26*b* being one example of a vehicle-engaging tip) that interconnect two generally parallel side plates 26*c* and 26*d*. The boot slidingly fits over a RIG-obstructing portion 18*a* of barrier 18. A shaft 64 pivotally couples brace 26 to barrier 18 so that brace 26 can pivot or rotate about an axis 66 of shaft 64, where axis 66 is at a substantially fixed location relative to axis 40 of barrier 18. This allows brace 26 to rotate between the activated position (FIGS. 3, 4 and 5) and the release position (FIGS. 1, 2 and 7). In this example, rod 62 extends between the two side plates 26*c* and 26*d* (FIG. 6) to be engaged by spring 42. Thus, spring 42 pushing against rod 62 urges barrier 26 to the release position (FIGS. 1, 2 and 7).

Figure 3:
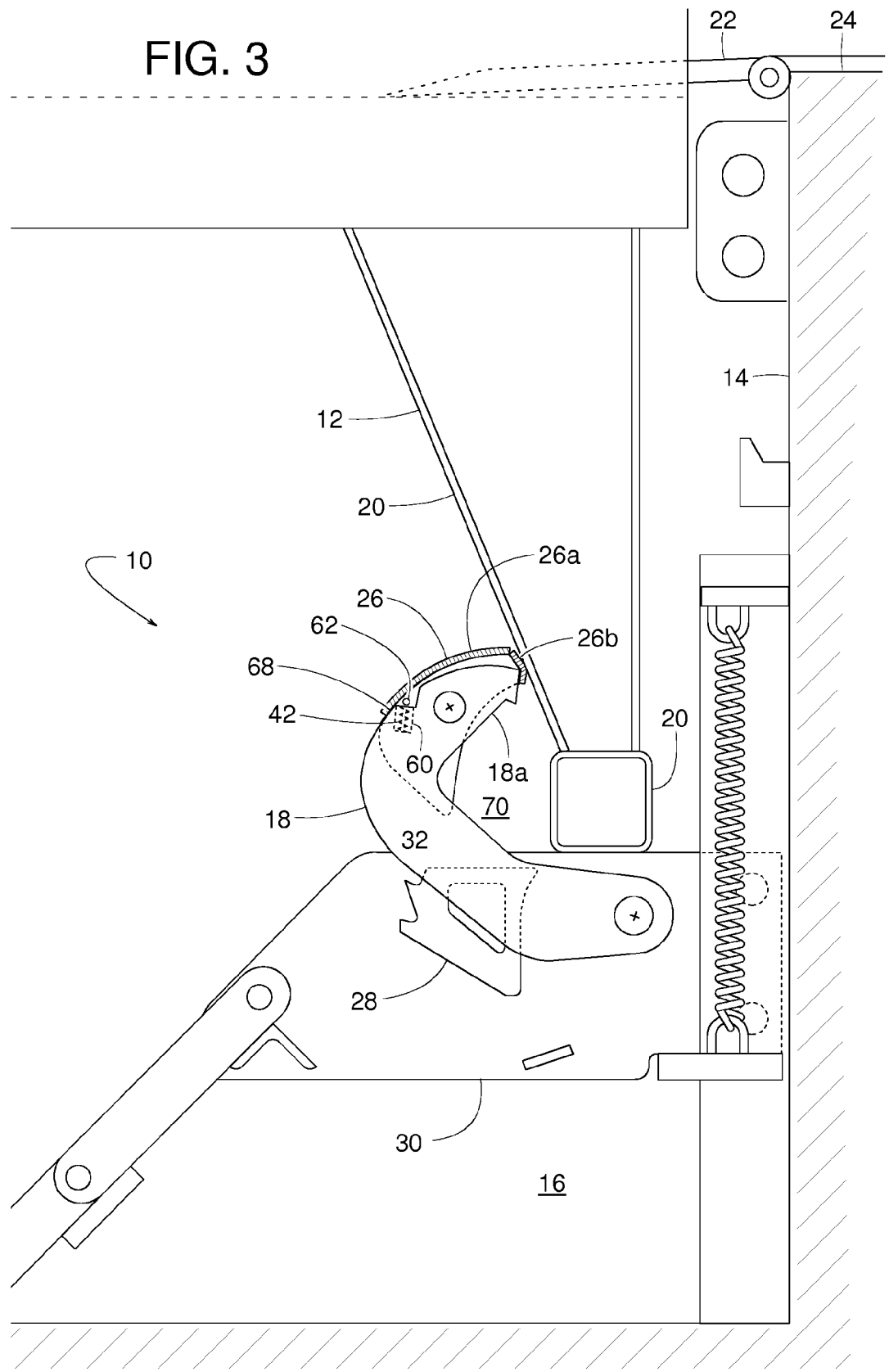
FIG. 3 is a cross-sectional side view similar to FIG. 1 but showing a barrier of the restraint in a blocking position.

After RIG 20 pushes main body 30 down to an operative position (FIGS. 3-7), and the RIG 20 is sufficiently close to dock face 14 (FIG. 3), drive unit 44 (FIG. 6) is activated to lift barrier 18 to the upper blocking position shown in FIG. 3. In this illustrated upper blocking position, nose plate 26*b* engages RIG 20. The engagement pushes brace 26 against the urging of spring 42 to the brace's activated position at which point curved front panel 26*a* of brace 26 engages or stops against a brace-engaging surface 68 of barrier 18. Barrier 18 and brace 26 have now captured RIG 20 within a RIG-receiving area 70 of barrier 18, thereby effectively restraining vehicle 12 at dock 16.

Figure 8:
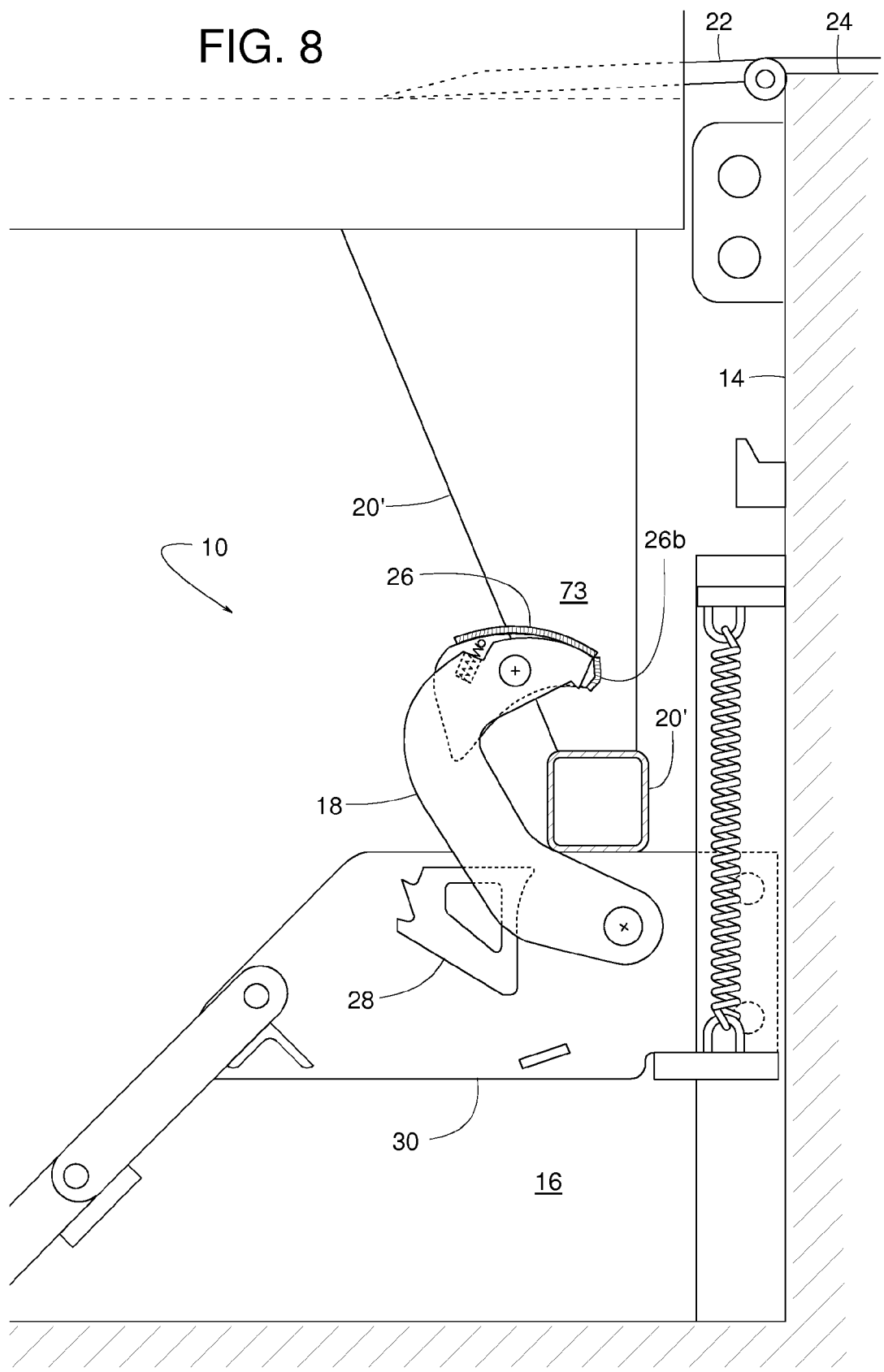
FIG. 8 is a cross-sectional side view similar to FIG. 3 but showing the vehicle restraint blocking another example RIG of a vehicle.
Figure 9:
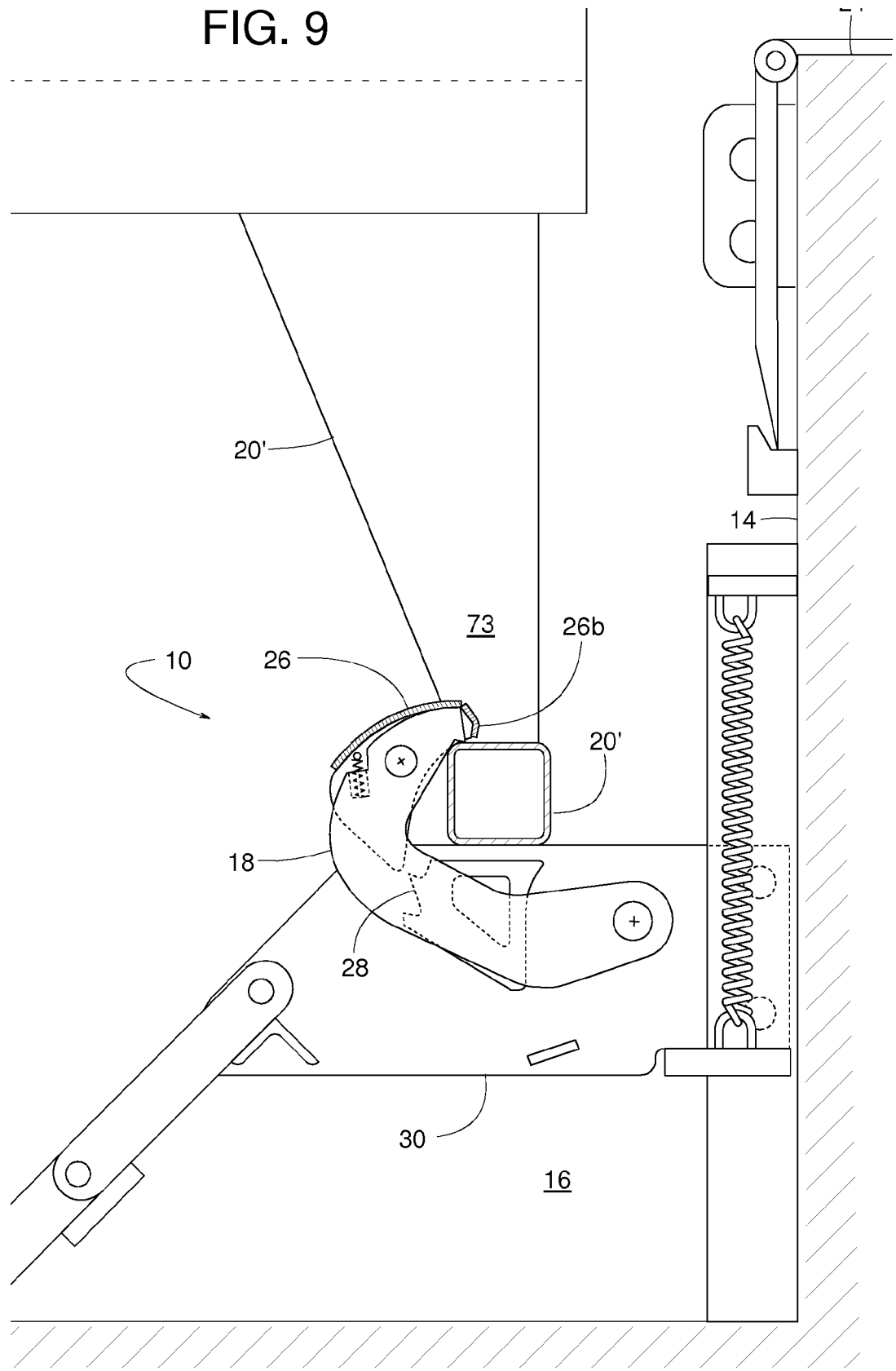
FIG. 9 is a cross-sectional side view similar to FIG. 8 but showing the restraint in a partially retracted position.

In some cases, as shown in FIG. 8, vertical support structure of a RIG 20' has an open area 73 through which barrier 18 can extend. In such cases, nose plate 26*b* might not engage RIG 20' and brace 26 can remain in the release position when barrier 18 is in the upper blocking position of FIG. 8. When brace 26 remains in the release position as RIG 20' moves forward away from dock face 14, open area 73 allows barrier 18 to restrain RIG 20' at a partially retracted position, as shown in FIG. 9. In the example where RIG 20' has open area 73, the operational sequence would deviate from the described example illustrated by FIGS. 1, 2, 3, 4, 5 and 7.

Returning to FIG. 3, while still being restrained (without open area 73, as shown in FIG. 3), vehicle 12 may move forward away from dock face 14, as indicated by an arrow 71 of FIG. 4, and RIG 20 might exert sufficient force to push barrier 18 back towards the stop position by overcoming the resistance of drive unit 44. However, barrier 18 moves or pivots to an intermediate blocking position (FIGS. 4 and 5) because the brace's tooth 32 engages or encounters catch 28, as shown in FIG. 4, which provides a solid mechanical engagement therebetween that limits further downward movement of barrier 18. To enable drive unit 44 to yield to the forward force exerted by RIG 20, some examples of drive unit 44 include a slip coupling 52. For the illustrated example, drive unit 44 comprises a drive train 46 coupling an output shaft 48 of a motor 50 to shaft 38, wherein shaft 38 is keyed or otherwise affixed to barrier 18 so that shaft 38 and barrier 18 rotate as a unit. Drive motor 50, which can rotate in either direction, includes slip coupling 52 and is able to selectively rotate barrier 18 between the barrier's stored position (FIGS. 1 and 2), at least one upper blocking position (e.g., FIG. 3), and at least one intermediate blocking position (e.g., FIGS. 4 and 5).

In some instances, particularly while loading or unloading cargo from a trailer with active air suspension, vehicle 12 might periodically shift or move in a direction indicated by an arrow 72 of FIG. 5. In such cases, to prevent tooth 32 from disengaging catch 28, a tooth-engaging surface 74 (first tooth-engaging surface) on catch 28 holds brace 26 in the activated position even when RIG 20 separates from barrier 18 and brace 26, as shown in FIG. 5. This brace-holding function is achieved by virtue of tooth-engaging surface 74 protruding appreciably into a circular path 76 defined by the tip of tooth 32 rotating about axis 66. In other words, tooth 32 extends a certain radius 78 from axis 66 to define circle 76, and tooth-engaging surface 74 extends appreciably into circle 76 to create an obstruction that inhibits brace 26 from rotating clockwise (as viewed in FIG. 5) about axis 66. The terms, "appreciably" and "appreciable distance" mean sufficiently noticeable to achieve the desired result of inhibiting the movement of tooth 32 along the path defined by circle 76. It should be noted that since the tip of tooth 32, radius 78 and axis 66 define circle 76; and since axis 66 moves with barrier 18, it naturally follows that the position of circle 76 also moves with the movement of barrier 18. Thus, circle 76 is not necessarily at a fixed location in space, but instead, circle 76 is at a fixed location relative to barrier 18. FIGS. 4 and 7, for example, show circle 76 at two different locations in space.

While tooth-engaging surface 74 inhibits clockwise rotation of brace 26 (clockwise as viewed in FIG. 5), brace-engaging surface 68 on barrier 18 inhibits counterclockwise rotation of brace 26 (counterclockwise as viewed in FIG. 5). Thus, brace 26 becomes captured between tooth-engaging surface 74 and brace-engaging surface 68, at least temporarily captured when vehicle restraint 20 is in the position or configuration shown in FIG. 5 to provide a bi-directional mechanical stop.

In addition or as an alternative to brace-engaging surface 68, some examples of catch 28 include a second tooth-engaging surface 80 such that surfaces 74 and 80 define a detent 82 therebetween (FIG. 1). In such examples, the second tooth-engaging surface 80 also extends into circle 76 so that brace 26 becomes captured between surfaces 74 and 80 when tooth 32 extends into detent 82, as shown in FIG. 5. In some examples, catch 28 includes at least another or second detent 84 (or even more) to provide barrier 18 and brace 26 with two or more intermediate blocking positions, which can be useful depending on the particular design of RIG 20.

To release vehicle 12 from the condition shown in FIGS. 4 and 5, in some cases, vehicle 12 first moves RIG 20 towards dock face 14, as indicated by an arrow 72 in FIG. 7, and then motor 50 (FIG. 6) momentarily raises barrier 18 to an upper blocking position (FIG. 7), as indicated by an arrow 88. This action disengages tooth 32 from catch 28 with tooth-engaging surface 74 being outside of circle 76, which allows spring 42 to push brace 26 back out to its release position of FIG. 7. With brace 26 in its release position of FIG. 7, motor 50 rotates barrier 18 freely back down from its blocking position of FIG. 7 to its stored position (FIGS. 1 and 2).

To illustrate an example method of operation, the sequence of FIGS. 1-3 illustrate, among other things, an example positioning of a main body underneath the RIG. The sequence of FIG. 2 to FIG. 3 illustrates an example of, among other things, "relative to the main body, rotating a barrier from a stored position clear of the RIG, through an intermediate blocking position to block the RIG, and to an upper blocking position to continue blocking the RIG." FIG. 3 illustrates, among other things, an example of "while the barrier is in the upper blocking position, positioning a brace in a spaced apart relationship with a catch, wherein the brace is connected to the barrier and is rotatable about an axis that is at a substantially fixed location relative to the barrier, and the catch is disposed on the main body and is substantially stationary relative thereto." Arrow 71 of FIG. 4 represents an example of "the vehicle forcing the barrier to the intermediate blocking position and forcing the brace into engagement with the catch." Arrow 72 of FIG. 5 represents an example of "the vehicle moving away from the barrier such that the vehicle becomes spaced apart from the barrier." Compression spring 42 pushing against rod 62 illustrates an example of "urging the brace to disengage the catch." Tooth 32 being obstructed by tooth-engaging surface 74 illustrates an example of "with the vehicle spaced apart from the barrier, the catch inhibiting the brace from disengaging the catch." Arrow 88 of FIG. 7 represents an example of "after the catch inhibiting the brace from disengaging the catch, moving the brace from the intermediate blocking position toward the upper blocking position." The separation of tooth 32 and catch 28, shown in FIG. 7, illustrates an example of "as a consequence of moving the brace from the intermediate blocking position toward the upper blocking position, automatically disengaging the brace from the catch."

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A vehicle restraint method for use at a loading dock for engaging a RIG (rear impact guard) of a vehicle, the vehicle restraint method comprising:
   positioning a main body underneath the RIG;
   rotating a barrier relative to the main body in a first rotational direction about a first axis from a stored position clear of the RIG to an upper blocking position to block the RIG;
   rotating a brace relative to the barrier in a second rotational direction opposite the first rotational direction about a second axis until prevented from further rotation in the second rotational direction by contacting the barrier, the second axis at a substantially fixed location relative to the barrier and extending substantially parallel to the first axis;
   while the brace is contacting the barrier, rotating the barrier in the second rotational direction about the first axis until the brace engages a catch affixed to the main body, the catch to secure the barrier in an intermediate blocking position between the stored position and the upper blocking position to continue blocking the RIG;
   urging the brace to rotate in the first rotational direction about the second axis; and
   capturing the brace in the intermediate position when the external force is removed from the brace after the tooth of the brace engages the catch by providing a radius between a pivot axis of the brace and a tip of the tooth of the brace greater than a radius between the pivot axis of the brace and a tip of the catch to enable the catch to obstruct the brace and prevent the brace from rotating in the first rotational direction when an external force is removed from the brace.

2. The vehicle restraint method of claim 1, further comprising:
   after obstructing the brace from rotating in the first rotational direction, rotating the barrier in the first rotational direction; and
   automatically disengaging the brace from the catch when the RIG is spaced apart from the barrier.

3. The vehicle restraint of claim 2, further comprising:
   using a spring for urging the brace to rotate in the first rotational direction; and
   using the spring for disengaging the brace from the catch.

* * * * *